(12) United States Patent
Kuwabara et al.

(10) Patent No.: US 9,751,795 B2
(45) Date of Patent: Sep. 5, 2017

(54) VIAL AND METHOD FOR PRODUCING THE SAME

(71) Applicant: NIPRO CORPORATION, Osaka-shi, Osaka (JP)

(72) Inventors: Hideo Kuwabara, Osaka (JP); Hideki Yamauchi, Osaka (JP); Yoshitaka Ishimi, Osaka (JP); Shinichiro Senga, Osaka (JP)

(73) Assignee: NIPRO CORPORATION, Osaka-Shi (JP)

( * ) Notice: Subject to any disclaimer, the term of this patent is extended or adjusted under 35 U.S.C. 154(b) by 22 days.

(21) Appl. No.: 13/846,428

(22) Filed: Mar. 18, 2013

(65) Prior Publication Data
US 2013/0233021 A1    Sep. 12, 2013

Related U.S. Application Data

(62) Division of application No. 11/920,425, filed as application No. PCT/JP2006/309674 on May 15, 2006, now Pat. No. 8,820,119.

(30) Foreign Application Priority Data

May 16, 2005 (JP) .................................. 2005-143307
Aug. 3, 2005 (JP) .................................. 2005-226042

(51) Int. Cl.
C03B 23/09  (2006.01)
C03B 29/02  (2006.01)
(Continued)

(52) U.S. Cl.
CPC .............. *C03B 29/02* (2013.01); *C03B 23/09* (2013.01); *C03B 23/099* (2013.01); *C03C 23/007* (2013.01); *A61J 1/14* (2013.01)

(58) Field of Classification Search
CPC ........ C03B 29/02; C03B 23/09; C03B 23/099
(Continued)

(56) References Cited

U.S. PATENT DOCUMENTS 1,210,572 A    1/1917   West
2,507,433 A    5/1950   Borchert et al.
(Continued)

FOREIGN PATENT DOCUMENTS

CN    1615279 A      5/2005
JP    53-141994      12/1978
(Continued)

OTHER PUBLICATIONS

United States Office Action for U.S. Appl. No. 11/920,425 dated Oct. 8, 2013.
(Continued)

*Primary Examiner* — Queenie Dehghan
(74) *Attorney, Agent, or Firm* — Birch, Stewart, Kolasch & Birch, LLP

(57) ABSTRACT

A method for producing a vial with low alkali elution by removing a deteriorated region caused by processing on an internal surface of a vial is disclosed. The method involves forming vials from borosilicate glass tubes including a first step of forming a borosilicate glass tube into a cup-shaped body by formation of a bottom of a vial, and a second step of forming the cup-shaped body into the vial by formation of a mouth of the cup-shaped body.

7 Claims, 1 Drawing Sheet

(51) Int. Cl.
*C03C 23/00* (2006.01)
*A61J 1/14* (2006.01)

(58) Field of Classification Search
USPC .................................................. 65/108, 109
See application file for complete search history.

(56) References Cited

U.S. PATENT DOCUMENTS

| | | | |
|---|---|---|---|
| 2,613,480 A * | 10/1952 | Mongan, Jr. | C03B 29/02 |
| | | | 266/251 |
| 3,654,926 A | 4/1972 | Rietman | |
| 3,737,293 A | 6/1973 | Maurer | |
| 4,330,317 A | 5/1982 | Vertova | |
| 4,385,919 A * | 5/1983 | Goffredi | C03B 23/095 |
| | | | 65/109 |
| 4,516,998 A | 5/1985 | Ritt et al. | |
| 4,525,192 A | 6/1985 | Booms | |
| 4,673,398 A | 6/1987 | Turner et al. | |
| 2005/0081565 A1 | 4/2005 | Kato et al. | |
| 2006/0267250 A1 | 11/2006 | Gerretz et al. | |

FOREIGN PATENT DOCUMENTS

| | | | |
|---|---|---|---|
| JP | 61256934 A * | 11/1986 | |
| JP | 63-40735 A | 2/1988 | |
| JP | 63-170233 A | 7/1988 | |
| JP | 3-242338 A | 10/1991 | |
| JP | 4-164839 A | 6/1992 | |
| JP | 4-310527 A | 11/1992 | |
| JP | 6-045481 A | 2/1994 | |
| JP | 6-076233 A | 3/1994 | |
| JP | 6-76233 B2 | 9/1994 | |
| JP | 7-206472 A | 8/1995 | |
| JP | 9-59037 A | 3/1997 | |
| JP | 09-183625 A | 7/1997 | |
| JP | 11-310424 A | 11/1999 | |
| JP | 2001-328612 A | 11/2001 | |
| JP | 3268470 B2 | 1/2002 | |
| JP | 2002-053336 A | 2/2002 | |
| JP | 2004-131367 A | 4/2004 | |
| JP | 2012-180276 A | 9/2012 | |

OTHER PUBLICATIONS

United States Office Action for U.S. Appl. No. 13/846,453 dated Sep. 19, 2013.
United States Office Action for U.S. Appl. No. 13/846,444 dated Apr. 23, 2014.
Extended European Search Report dated Feb. 19, 2010 for European Application No. 06732605.
International Search Report dated Jun. 20, 2006 for International Application No. PCT/JP2006/309674.
US Advisory Action dated Apr. 22, 2011, for U.S. Appl. No. 11/920,425.
US Final Office Action dated Dec. 8, 2010, for U.S. Appl. No. 11/920,425.
US Non-Final Office Action dated Apr. 23, 2010, for U.S. Appl. No. 11/920,425.
US Non-Final Office Action dated Mar. 4, 2013, for U.S. Appl. No. 11/920,425.
US Restriction Requirement dated Dec. 11, 2009, for U.S. Appl. No. 11/920,425.
United States Office Action for U.S. Appl. No. 13/846,444 dated Oct. 30, 2014.
U.S. Office Action dated May 21, 2014 for U.S. Appl. No. 13/846,453.
Extended European Search Report for Application No. 15173882.0 issued on Nov. 9, 2015.
U.S. Office Action for U.S. Appl. No. 13/846,444 issued on Dec. 8, 2015.
Yashchishin, I. N. et al., "Improving the Chemical Resistance of Glass Containers by Thermochemical Treatment with a Reagent Solution", Glass and Ceramics, Springer, New York, NY, US, vol. 53, No. 5/06, May 1, 1996, pp. 135-137.
U.S. Office Action for U.S. Appl. No. 13/846,444 issued on May 26, 2016.

\* cited by examiner

VIAL AND METHOD FOR PRODUCING THE SAME

This application is a Divisional of co-pending application Ser. No. 11/920,425 filed on Nov. 15, 2007 and for which priority is claimed under 35 U.S.C §120. Application Ser. No. 11/920,425 is the national phase of PCT International Application No. PCT/JP2006/309674 filed on May 15, 2006. PCT International Application No. PCT/JP2006/309674 claims the benefit of priority to JP-2005-226042, filed on Aug. 3, 2005 and JP-2005-143307, filed on May 16, 2005. The entire content of all of the above applications is hereby incorporated by reference.

TECHNICAL FIELD

The present invention relates to a vial with low alkali elution and a method for producing the same.

BACKGROUND ART

Automatic vial-forming machines forming vials from borosilicate glass tubes include a vertical type and a horizontal type. In both cases, vials are produced by first forming a mouth of a vial and then forming a bottom of the vial. Chemical quality of the resultant vials are evaluated by a value of eluted alkali measured by Method 2 (internal surface method) defined in the Japanese Pharmacopoeia or a testing method in conformity with the same. To obtain vials with low alkali elution, it is general practice to perform a process operated at low temperatures for a long time, away from use of a process operated at high temperatures for a short time.

However, even if the vials are produced by the low-temperature process, they have a deteriorated region caused by processing in the form of a belt on the internal surface close to the bottom of the vial, which has problems such as, for example, alkali elution affecting pharmaceutical products contained therein. This deterioration caused by processing is considered to be a phenomenon such that alkali-containing materials exuded from or vaporized from the glass are condensed to a plurality of small droplets and deposited on the internal surface of the vial in the process of forming the vial bottom from the borosilicate glass tube.

In order to lower or prevent elution of alkali from the condensed droplets on the internal surface of the vial, some processes have been proposed that include a method (S method) of allowing the alkali in the deteriorated region to react with sulphate ions at the final stage of vial forming process, and then washing the vial with water to remove alkali as sodium sulphate ($Na_2SO_4$); and a method of covering the internal surface of the vial with a thin film of silica ($SiO_2$) by chemical vapor deposition (CVD) to prevent elution of alkali. However, the S method requires an increased cost form washing the vial to remove white sodium sulphate produced on the internal surface of the vial and the internal surface after alkali extraction has a markedly uneven cratered surface. On the other hand, the method of covering the internal surface of the vial with the silica thin film results in increased processing cost.

Patent document 1: JP H06-45481B
Patent document 2: JP H06-76233B
Patent document 3: JP 3,268,470

DISCLOSURE OF INVENTION

Problems to be Solved by the Invention

Accordingly, a first issue to be solved is the deteriorated region produced by processing on the internal surface of the vial, and a second issue is the removal of the deteriorated region produced by processing. It is therefore an object of the present invention to provide a vial with low alkali elution and a method for producing the same.

Means for Solving the Problems

A main feature of the present invention is to minimize the formation of a deteriorated region produced by processing on an internal surface of a vial in a process of forming vials from borosilicate glass tubes by the steps of forming a bottom first and then forming a mouth. The most distinguishing feature of the present invention is that the method comprises the steps of forming a bottom, subsequently removing the produced deteriorated region by fire blasting with an oxygen-fire flame, and then forming a mouth.

According to the present invention, there is provided a method for producing vials with low alkali elution by forming vials from borosilicate glass tubes, said method comprising a first step of forming a borosilicate glass tube into a cup-shaped body to form a bottom of a vial; and a second step of forming a mouth of said cup-shaped body to complete a vial with reduced alkali elution. Also provided is a method for producing vials with low alkali elution by forming vials from borosilicate glass tubes, said method comprising a first step of forming a borosilicate glass tube into a cup-shaped body to form a bottom of a vial; a second step of fire-blasting an internal surface of said cup-shaped body by a certain length from the bottom toward an opening of said cup-shaped body with flames to remove a deteriorated region caused by processing; and a third step of forming a mouth of said cup-shaped body to complete a vial with reduced alkali elution. Further provided is a method for producing vials with low alkali elution by forming vials from borosilicate glass tubes, said method comprising: a first step of forming a mouth of a vial; a second step of forming a bottom of the vial; and a third step of fire-blasting an internal surface of the vial from the bottom toward an opening of said cup-shaped body by a certain length with flames to remove the deteriorated region caused by processing to complete a vial with reduced alkali elution.

According to the present invention, there is further provided a vial produced by forming a borosilicate glass tube, characterized in that said vial is reduced in alkali elution by a procedure comprising a first step of forming a borosilicate glass tube into a cup-shaped body to form a bottom of a vial; and a second step of forming a mouth of said cup-shaped body.

Also provided is a vial produced by forming a borosilicate glass tube, characterized in that said vial is reduced in alkali elution by a procedure comprising: a first step of forming a borosilicate glass tube into a cup-shaped body to form a bottom of a vial; a second step of fire-blasting an internal surface of said cup-shaped body from the bottom toward the opening of said cup-shaped body by a certain distance with flames to remove a deteriorated region caused by forming; and a third step of forming a mouth of said cup-shaped body to complete a vial with reduced alkali elution.

Further provided is a vial produced by forming a borosilicate glass tube, characterized in that said vial is reduced in alkali elution by a procedure comprising: a first step of forming a borosilicate glass tube to form a mouth of a vial; a second step of forming the resultant glass tube to form a bottom of the vial; and a third step of fire-blasting an internal surface of the vial from the bottom toward the opening of said cup-shaped body by a certain distance with flames to remove a deteriorated region caused by forming, thereby completing the vial with reduced alkali elution.

In addition, the aforesaid flames are gas-and-oxygen flames produced by a point burner. Further, the aforesaid fire-blasting is carried out while rotating the vial.

Effects of the Invention

In the conventional automated forming process of forming vials from borosilicate glass tubes, the vial is produced by forming its mouth at the start and then forming its bottom. In the process of forming the bottom, a number of small droplets containing alkali ($Na_2O$) exuded or vaporized from the glass are deposited on the internal surface of the vial to produce a deteriorated region caused by processing, which causes alkali elution.

In contrast thereto, when the borosilicate glass tube is formed into a cup-shaped container only by formation of a bottom, the alkali elution test showed that an amount of alkali eluted from the cup-shaped container is reduced to one-fifth to one-sixth of that of the vial formed by the conventional process comprising the steps of forming a mouth first and forming a bottom. Further, an internal surface of the above cup-shaped body is subjected to fire-blasting by means of an oxygen-gas flame from a point burner, so that the deteriorated region caused by processing can be completely removed from the container. According to the present invention therefore it is possible to obtain vials of which a deteriorated region caused by processing has been minimized or removed from the deteriorated region caused by processing.

BEST MODE FOR CARRYING OUT THE INVENTION

Figure 1:
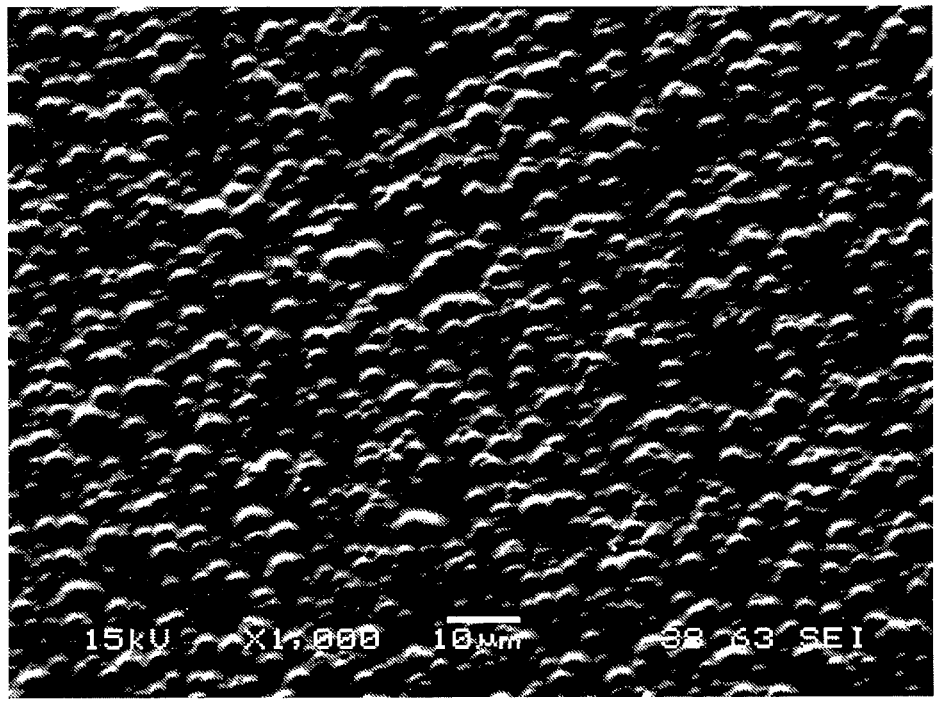
FIG. 1 is an electron microscope photograph of a deteriorated region affected by processing of a cup C according to the present invention.

The inventors have found that, when the forming steps in the process of forming borosilicate glass tube into a vial are carried out in the order of bottom-forming to mouth-forming, the quantity of eluted alkali is reduced to one-fifth to one-sixth of that of the vial formed by the conventional process proceeding from mouth-forming to bottom-forming. In the conventional process proceeding from mouth forming to bottom forming, alkali-containing materials exuded from or vaporized from the glass at the time of bottom forming are trapped in the vial-in-process because of a narrowed mouth of the vial-in-process, resulting in formation of the deteriorated region due to processing. In contrast, in the process proceeding from bottom forming to mouth forming, it is believed that the vaporized materials are easily released from the vial-in-process to the outside because of a large opening of the vial-in-process, resulting in decrease in formation of the deteriorated region due to processing, which in turn causes lowering of the alkali elution. When the borosilicate glass is intensely heated by an oxygen-gas flame of the point burner, the flame changes from an early blue flame to a yellow flame with increasing temperature. This results from the flame reaction of sodium (Na) present in the glass. Based on these observations, the inventors have found that use of fire-blasting with a sharp and strong oxygen-gas flame makes it possible to remove the deteriorated region induced by processing in the internal surface of the vial. It is believed that the fire-blasting is shot-blasting with particle ions and molecules in the flame.

In order to remove the processing-induced deteriorated region by fire-blasting, it is required to allow the oxygen-gas flame jet from the point burner to flow out with little resistance after impingement on the inner surface of the glass tube. To this end, the vial forming process is required to begin with forming of a bottom to make a glass tube into a cup-shaped body and then proceed to forming of a mouth. It should be noted that the quantity of eluted alkali for evaluation of effects of the forming process according to the present invention was determined as an amount (mL) of 0.01 mol/L sulfuric acid consumed in accordance with Method 2 (internal surface method) defined in the Japanese Pharmacopoeia.

Example 1

Using the conventional process (mouth-forming to bottom-forming process), there were produced vials with 60 mm-height×12.5 mm-internal mouth diameter (Vial P) from borosilicate glass tubes with a 30 mm-outer diameter and a 1.5 mm-thickness. The quantity of eluted alkali measured for "vial P" was 0.74 mL.

Separate from the above, the same glass tubes were formed into cup-shaped containers (cup A) by forming a bottom with an automatic vertical forming machine. The quantity of eluted alkali measured for "cup A" was 0.10 mL. Using a horizontal forming machine, "cup A" was provided with a mouth to form it into a vial (vial Q) in accordance with the forming process of the present invention (bottom-forming to mouth-forming process). The quantity of eluted alkali measured for "vial Q" was also 0.10 mL and there was no change in alkali elution caused by the mouth-forming process. It is believed that this results from the fact that the processing temperature of the mouth-forming is lower than that of the bottom-forming and causes low volatilization of the alkali-containing material.

TABLE 1

| Sample | outer diameter × height × thickness (mm) | inner diameter of mouth (mm) | Eluted alkali (mL) |
| --- | --- | --- | --- |
| Vial P (mouth-forming -> bottom-forming) | 30 × 60 × 1.5 | 12.5 | 0.74 |
| Cup A | same as above | 27.0 | 0.10 |
| Vial Q (bottom-forming-> mouth-forming) | same as above | 12.5 | 0.10 |

Example 2

A borosilicate glass tube with a length of 200 mm was closed at one end thereof with a silicone rubber stopper, held vertically, and the filled with a volume of water and autoclaved at 121° C. for 60 minutes. The quantity of eluted alkali per 100 mL was 0.03 mL. This value was regarded as the quantity of eluted alkali for the vial never affected by processing.

Samples (cup B) were formed from the "cup A" in Example 1 by fire-blasting an internal surface of the "cup A" about 10 mm above its bottom with an obliquely-directed oxygen-gas flame about 10 cm long, while holding and rotating the "cup A". The quantity of eluted alkali measured for "cup B" was 0.03 mL. It is believed that this results from the fact that the deteriorated region due to processing is removed by the fire-blasting, thereby recovering the original surface of the borosilicate glass tubes. The fire-blasting was done using a point burner with a 1.0 mm bore diameter which is fed by mixed gas of 0.75 L/min town gas (methane) and 2.20 L/min oxygen to generate an about 10 cm long flame.

Then, the "cup B" was provided with a mouth by a horizontal forming machine to form it into a vial (vial R), of which the quantity of eluted alkali was 0.03 mL. As mentioned in Example 1, It is believed that this results from the fact that the processing temperature of the mouth-forming is lower than that of the bottom-forming, thus making it harder for the alkali-containing material to volatilize.

TABLE 2

| Sample | outer diameter × height × thickness (mm) | bore diameter (mm) | Eluted alkali (mL) |
|---|---|---|---|
| borosilicate glass tube | 30 × 60 × 1.5 | 27.0 | 0.03 |
| Cup A | same as above | 27.0 | 0.10 |
| Cup B (fire-blasting treatment) | same as above | 27.0 | 0.03 |
| Vial R (Cup B -> mouth-forming) | same as above | 12.5 | 0.03 |

Example 3

Borosilicate glass tubes with a 40.5 mm-outer diameter and a 1.5 mm-thickness were formed into vials with 78.5 mm-height×22.0 mm-internal mouth diameter by the conventional process (mouth-forming to bottom-forming). The quantity of eluted alkali measured for the vial was 0.57 mL. Using the automatic vertical forming machine, a glass tube was provided with a bottom to prepare a cup-shaped container (cup C). The quantity of eluted alkali measured for cup C was 0.21 mL. The quantity of eluted alkali measured for cup D prepared by fire-blasting an internal surface of the "cup C" was 0.03 mL. The quantity of eluted alkali measured for a vial made from the cup D by provision of a mouth with the horizontal forming machine was 0.03 mL.

TABLE 3

| Sample | outer diameter × height × thickness (mm) | bore diameter (mm) | Eluted alkali (mL) |
|---|---|---|---|
| Vial S (mouth-forming-> bottom-forming) | 40.5 × 78.5 × 1.5 | 22.0 | 0.57 |
| Cup C | same as above | 37.5 | 0.21 |
| Cup D (fire-blasting treatment) | same as above | 37.5 | 0.03 |
| Vial T (Cup D ->mouth-forming) | same as above | 22.0 | 0.03 |

Figure 2:
FIG. 2 is an electron microscope photograph showing a deteriorated region affected by processing of a cup C according to the present invention.

Electron microscopic observation on the "cup C" showed that there is a deteriorated region due to processing, which has a crater-like pattern resulting from alkali-containing volatiles (a photograph of FIG. 1). On the other hand, electron microscopic observation of the cup D, prepared by fire-blasting the deteriorated region due to processing of "cup C", showed that the region corresponding to the deteriorated region due to processing has no crater-like pattern (photograph of FIG. 2). This shows that the deteriorated region due to processing was removed by fire-blasting.

Example 4

Borosilicate glass tubes with a 40.5 mm-outer diameter and a 1.5 mm-thickness were formed into vials with 78.5 mm-height×22.0 mm-internal mouth diameter by the conventional process (mouth-forming to bottom-forming). The quantity of eluted alkali measured for the resultant vial was 0.57 mL. Using the point burner which generates a gas-oxygen mixed gas flame (about 10 cm long), the resultant vials were subjected to fire blasting so that the flame is blasted to the deteriorated region about 10 mm above the bottom while rotating the vial. The vial subjected to the fire-blasting for 40 seconds showed that the quantity of eluted alkali was reduced to 0.30 mL, while vial subjected to the fire-blasting for 60 seconds showed that the quantity of eluted alkali was reduced to 0.13 mL. The vials after the fire-blasting treatment possess no change in both shape and size. It is to be noted that the fire-blasting time (seconds) which has an effect on decrease of alkali elution can be shortened by preheating of the vials. From these results, it was confirmed that the deteriorated region of the vials caused by the conventional forming process can be substantially removed by fire-blasting.

TABLE 4

| Sample | Outer diameter × height × thickness (mm) | bore diameter (mm) | Eluted alkali (mL) |
|---|---|---|---|
| Vial S (mouth-forming-> bottom-forming) | 40.5 × 78.5 × 1.5 | 22.0 | 0.57 |
| Vial T (fire blasting) | same as above (40 seconds) | 22.0 | 0.30 |
| Vial U (fire blasting) | same as above (60 seconds) | 22.0 | 0.13 |

The invention claimed is:

1. A method for producing a vial with low alkali elution by forming the vial from a borosilicate glass tube, said method comprising:
    forming the borosilicate glass tube into a cup-shaped body to form a bottom of the vial as a first step,
    fire-blasting an internal surface of the cup-shaped body with a flame is carried out as a second step to remove a deteriorated region caused by processing, and
    then forming a mouth of the vial is carried out as a third step.

2. The method according to claim 1, wherein said fire-blasting is carried out from the bottom of the cup-shaped body toward an opening of the cup-shaped body by a certain length with the flame.

3. The method according to claim 2, wherein said flame is a gas-and-oxygen flame produced by a point burner.

4. The method according to claim 2 wherein said fire-blasting is carried out while rotating the vial.

5. The method according to claim 1, wherein said flame is a gas-and-oxygen flame produced by a point burner.

6. The method according to claim 5 wherein said fire-blasting is carried out while rotating the vial.

7. The method according to claim 1 wherein said fire-blasting is carried out while rotating the vial.

\* \* \* \* \*